US009768669B2

(12) United States Patent
Huber (10) Patent No.: US 9,768,669 B2
(45) Date of Patent: Sep. 19, 2017

(54) ELECTRIC MACHINE STATOR COOLING SYSTEM

(71) Applicant: Bayerische Motoren Werke Aktiengesellschaft, Munich (DE)

(72) Inventor: Andreas Huber, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 279 days.

(21) Appl. No.: 14/505,201

(22) Filed: Oct. 2, 2014

(65) Prior Publication Data

US 2015/0015096 A1    Jan. 15, 2015

Related U.S. Application Data

(63) Continuation of application No. PCT/EP2013/055890, filed on Mar. 21, 2013.

(30) Foreign Application Priority Data

Apr. 3, 2012 (DE) .................. 10 2012 205 404

(51) Int. Cl.
*H02K 9/19* (2006.01)
*H02K 5/20* (2006.01)
*H02K 9/18* (2006.01)

(52) U.S. Cl.
CPC .......... *H02K 9/19* (2013.01); *H02K 5/20* (2013.01); *H02K 9/18* (2013.01)

(58) Field of Classification Search
CPC .. H02K 9/19; H02K 9/18; H02K 9/14; H02K 5/20

USPC .............................. 310/54, 58, 59
See application file for complete search history.

(56) References Cited

U.S. PATENT DOCUMENTS

| 6,179,342 | B1 | 1/2001 | Shen | |
| 6,722,422 | B1 * | 4/2004 | Feldmeier | F28D 7/106 138/114 |
| 6,909,210 | B1 | 6/2005 | Bostwick | |
| 2004/0035481 | A1 | 2/2004 | Lim et al. | |
| 2008/0284263 | A1 * | 11/2008 | Dessirier | H02K 5/20 310/54 |
| 2009/0261668 | A1 * | 10/2009 | Mantere | H02K 9/19 310/54 |

(Continued)

FOREIGN PATENT DOCUMENTS

| CN | 1885683 A | 12/2006 |
| CN | 102025226 A | 4/2011 |

(Continued)

OTHER PUBLICATIONS

International Search Report dated Oct. 21, 2014 (Three (3) pages).

(Continued)

*Primary Examiner* — Michael Andrews
(74) *Attorney, Agent, or Firm* — Crowell & Moring LLP (57) ABSTRACT

An electrical machine, particularly for driving a vehicle, comprises a rotor having a rotor shaft extending in the axial direction, a stator encompassing the rotor, and a stator housing that accommodates the stator and has an integral cooling duct. The cooling duct is formed by an alternating sequence of channels extending in the axial or circumferential direction and deflector portions which connect adjacent channels in a meandering fashion.

18 Claims, 10 Drawing Sheets

(56) References Cited

U.S. PATENT DOCUMENTS

2010/0001597 A1* 1/2010 Noll .................. H02K 5/20
                                                    310/58
2010/0007227 A1* 1/2010 Smith ................ H02K 5/20
                                                    310/64

FOREIGN PATENT DOCUMENTS

| DE | 197 57 605 A1 | 6/1999 | | |
|---|---|---|---|---|
| DE | 10 2007 035 271 A1 | 1/2009 | | |
| EP | 0 729 215 A2 | 8/1996 | | |
| EP | 2 110 931 A2 | 10/2009 | | |
| EP | 2 299 561 A2 | 3/2011 | | |
| IT | WO 2012024778 A1 * | 3/2012 | ............... | H02K 5/20 |
| WO | WO 2009/015946 A1 | 2/2009 | | |
| WO | WO 2012/024778 A1 | 3/2012 | | |

OTHER PUBLICATIONS

Written Opinion (PCT/ISA/237) dated Oct. 21, 2014 with partial English translation (Nine (9) pages).
German Search Report dated Feb. 25, 2013, with partial English translation (Ten (10) pages).
Chinese Office Action issued in Chinese counterpart application No. 201380014505.7 dated Sep. 29, 2016, with English translation (Sixteen (16) pages).
Chinese Office Action issued in Chinese counterpart application no. 201380014505.7 dated May 4, 2017, with partial English translation (Thirteen (13) pages).

* cited by examiner

ELECTRIC MACHINE STATOR COOLING SYSTEM

CROSS REFERENCE TO RELATED APPLICATIONS

This application is a continuation of PCT International Application No. PCT/EP2013/055890, filed Mar. 21, 2013, which claims priority under 35 U.S.C. §119 from German Patent Application No. 10 2012 205 404.9, filed Apr. 3, 2012, the entire disclosures of which are herein expressly incorporated by reference.

BACKGROUND AND SUMMARY OF THE INVENTION

The present invention relates to an electrical machine, particularly an electrical machine for driving a motor vehicle.

With larger electrical machines, which are used, for example, for driving a motor vehicle, a cooling of the stator housing is sometimes necessary to dissipate the resulting power loss.

The object of the present invention is to specify an electrical machine which can be effectively cooled while being economic to produce and requiring little maintenance in operation.

This object is achieved by the characteristics of claim 1. The dependent claims relate to preferred embodiments of the invention.

The object is achieved by an electrical machine, particularly for driving a motor vehicle, comprising a rotor having a rotor shaft extending in the axial direction. Furthermore, a stator encompassing the rotor and a stator housing which accommodates the stator are provided. A cooling duct is integrated in this stator housing. The cooling duct is made up of a sequence of channels and deflector portions. A deflector portion is located between adjacent channels in each case. As a result, the cooling duct is formed in a meandering fashion along the circumference of the stator housing. The cooling duct in the stator housing is preferably produced by appropriate recesses during the casting of the stator housing. Alternatively or in addition, the channels and deflector portions of the cooling duct can also be produced by machining. The invention enables the cooling duct to nestle very closely against the radii to be cooled. Furthermore, the stator is very easy to construct, wherein the cooling duct can be integrated at the same time. For example, a multi-layer structure of the stator housing is not necessary to form the cooling duct; however, this is not excluded.

The directions on the electrical machine are defined as follows: The rotor shaft extends in an axial direction. Perpendicular to the axial direction is a radial direction. A circumferential direction is defined perpendicular to the radial direction and perpendicular to the axial direction. Accordingly, a sleeve surface of the stator housing extends along the circumferential direction. The two face sides of the stator housing lie perpendicular to the axial direction and parallel to the radial direction.

Preferably, it is provided that the channels and deflector portions merge impermeably into one another, thus forming a closed cooling duct. As a result, the coolant, in particular a fluid coolant, can only flow along pre-defined paths through the cooling duct. In particular, the coolant flows from one channel via a deflector portion into the next channel, and from this channel in turn via a further deflector portion into the next channel. The individual channels therefore each have only two openings, next to which a deflector portion is arranged in each case. Furthermore, it is preferably provided that a deflector portion connects only two channels to one another. This specifies a defined path for the coolant in the cooling duct. Alternatively, however, a deflector portion can also combine the coolant flow from two or more channels and/or distribute it between two or more channels in any proportion.

In a preferred embodiment, the channels are rectangular. Furthermore, preferably, a channel width is defined in the circumferential direction and a channel height is defined in the radial direction. Particularly preferably, it is provided that a ratio of channel height to channel width lies between $\frac{1}{10}$ and $\frac{1}{2}$. As a result, relatively wide channels with relatively low height are provided. This results in a low thickness of the stator housing in the radial direction and, at the same time, enables the surface area for transferring heat between the coolant and the stator to be cooled or the stator housing to be cooled to be very wide.

Advantageously, the channels in the sleeve surface of the stator housing extend parallel to the axial direction. With an arrangement of the channels parallel to the axial direction, the deflector portions enable a deflection through approximately 180 degrees. Preferably, however, a deviation from the axial direction by up to thirty degrees is also possible. An arrangement of the channels in the motor housing in parallel open rings around the motor axis is also conceivable, wherein the individual rings are in each case connected to one another by deflector regions.

The deflector portions are designed in such a way that the coolant can be rerouted from one channel to another channel very effectively. In doing so, attention must be paid to the flow of the coolant in order to reduce the energy expended for a coolant pump. Furthermore, as few dead water zones as possible must form in the coolant flow, so that the coolant is always in motion and is able to dissipate as much heat as possible.

Preferably, it s therefore provided that a ratio of the maximum cross-sectional area in the deflector portion to the mean cross-sectional area in the channel lies between 0.5 and 4. Preferably, this ratio lies between 1 and 2.

In an advantageous embodiment, the deflector portions extend in the circumferential direction and the channels open out laterally into the deflector portions.

For this purpose, the deflector portions are formed, for example, from straight tubes. These tubes extend in the circumferential direction and the channels open out into the sleeve surface of the tubes. The cross section of the tubes is in particular rectangular or round. The tubes can be straight or slightly curved. The slightly curved tubes provide a very loss-optimized flow deflection from one channel to another channel.

Particularly preferably, the deflector portion is banana-shaped. If this banana shape is viewed along the circumferential direction, then the cross-sectional area in the deflector portion initially increases up to a maximum value. From this maximum value, the cross-sectional area in the deflector portion decreases once more. The two channels open out laterally into the sleeve surface of this banana shape.

In particular, it is provided that the banana-shaped deflector portion has a convex curvature. The convex curvature extends in the axial direction and/or in the radial direction. In particular, the curved form of the banana is defined as follows: The banana shape is bounded on the axial side by a wall. This wall is curved in the axial direction and therefore has a "convex curvature in the axial direction". The banana shape is likewise bounded outwards or inwards, that is to say outwards or inwards in the radial direction, and can be curved. Here, the banana-shaped deflector portion has a convex curvature in the radial direction.

In a preferred embodiment, a radially innermost boundary of the channels is at the same distance from the rotor shaft as a radially innermost boundary of the deflector portions. In particular, this design is preferably provided in conjunction with the banana-shaped deflector portions. The curvature of the banana-shaped deflector portion therefore extends exclusively outwards in the radial direction. On the one hand, this results in a flow-optimized deflection routing for the cooling medium. On the other, this design enables a very large surface area to be formed between the stator and the cooling duct.

In a further alternative, the deflector portion is in the form of a sharply curved tube. Here, the tube is curved to the extent that the channels can open out into the tube on the face side. In the case of channels which are arranged in parallel, this means that the tube is curved through 180 degrees. This curved tube can have a round, oval or rectangular cross section.

The rotor shaft is preferably mounted in the stator housing. The cooling duct can therefore also be used simultaneously for cooling the bearing of the rotor shaft. Particularly preferably, the cooling duct has a bearing cooling loop instead of a deflector portion at least one point. The bearing cooling loop leads from the end of one channel, preferably around the bearing of the rotor shaft, to another channel.

Alternatively, it is also possible to relocate the deflector portions in the face side of the stator housing in order to form the bearing cooling loop. As a result, the deflector portions are closer to the bearing and can be used better for cooling the bearing. In particular, at their ends, the channels have intermediate pieces curved through approximately 90 degrees for this purpose. These intermediate pieces are curved in the direction of the rotor shaft, so that the deflector portions are then arranged in the face side of the stator housing.

The deflector portions in the overall cooling duct do not all have to have the same design. It is therefore also provided that different deflector portions are arranged between the channels. It is equally possible to form a bearing cooling system for the bearing of the rotor shaft on only one side or on both sides. The bearing cooling system can be different on both face sides; for example, a bearing cooling loop can be formed on one face side and the deflector portions can be relocated in the face side of the stator housing for cooling the bearing on the other face side.

Furthermore, it is preferably provided that the stator housing comprises a base body and a cover. The cover substantially forms the one face side of the stator housing. The deflector portions of one axial side and the channels are preferably formed in the base body. The deflector portions of the other axial side are then located in the cover. The two-part design of the stator housing results in easier production of the hollow spaces. A design with a sleeve element and two face-side covers is likewise conceivable.

Preferably, the cooling duct includes at least two connections for a coolant pump.

Preferably, the electrical machine is used for driving a motor vehicle.

Exemplary embodiments of the present invention are described in detail below with reference to the accompanying drawing. In the drawing:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
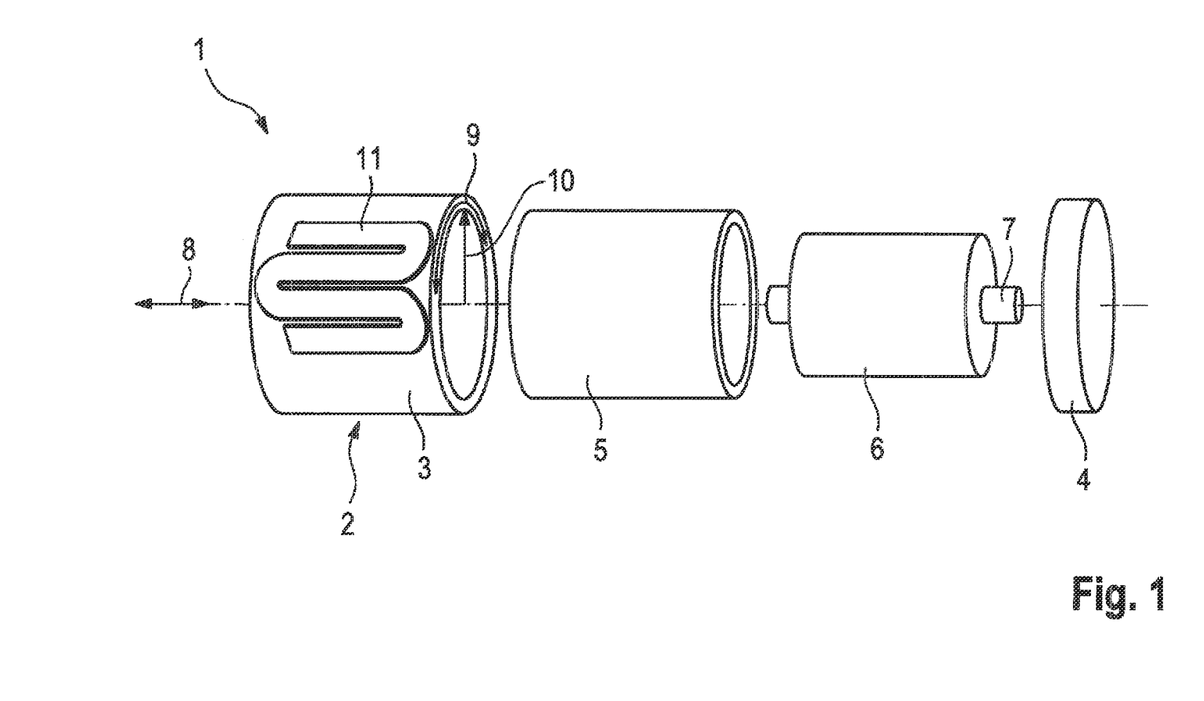
FIG. 1 shows an electrical machine according to the invention according to all exemplary embodiments.

The general construction of the electrical machine 1 for all exemplary embodiments is explained on the basis of FIG. 1. The electrical machine 1 comprises a stator housing 2, a stator 5 and a rotor 6. The stator 5 is attached to the inner wall of the cylindrical stator housing 2 in a fixed rotational relationship. The rotor 6 has a rotor shaft 7. This rotor shaft 7 is mounted in the stator housing 2 so that the rotor 6 can be rotated with respect to the stator 5.

The stator housing 2 comprises a cylindrical base body 3 and one or two covers 4. Each cover 4 forms a face side of the stator housing 2.

The following directions are defined on the electrical machine 1: An axial direction 8 extends along the rotor shaft 7. A radial direction 10 is defined perpendicular to the axial direction 8. A circumferential direction is defined perpendicular to the axial direction 8 and perpendicular to the radial direction 10. The circumferential direction 9 extends along a sleeve surface of the stator housing 2.

A cooling duct 11 for cooling the stator housing 2 or for cooling the stator 5 is formed in the stator housing 2. The form of the cooling duct 11 is shown purely by way of example in FIG. 1. The exact design of the cooling duct 11 is explained in more detail in the following different exemplary embodiments. At the same time, the cooling duct 11 can also be formed partially in the cover 4 and not only in the base body 3.

Only the cooling duct 11 is shown in the following figures. The same or functionally identical components are allocated the same references in all exemplary embodiments.

Figure 2:
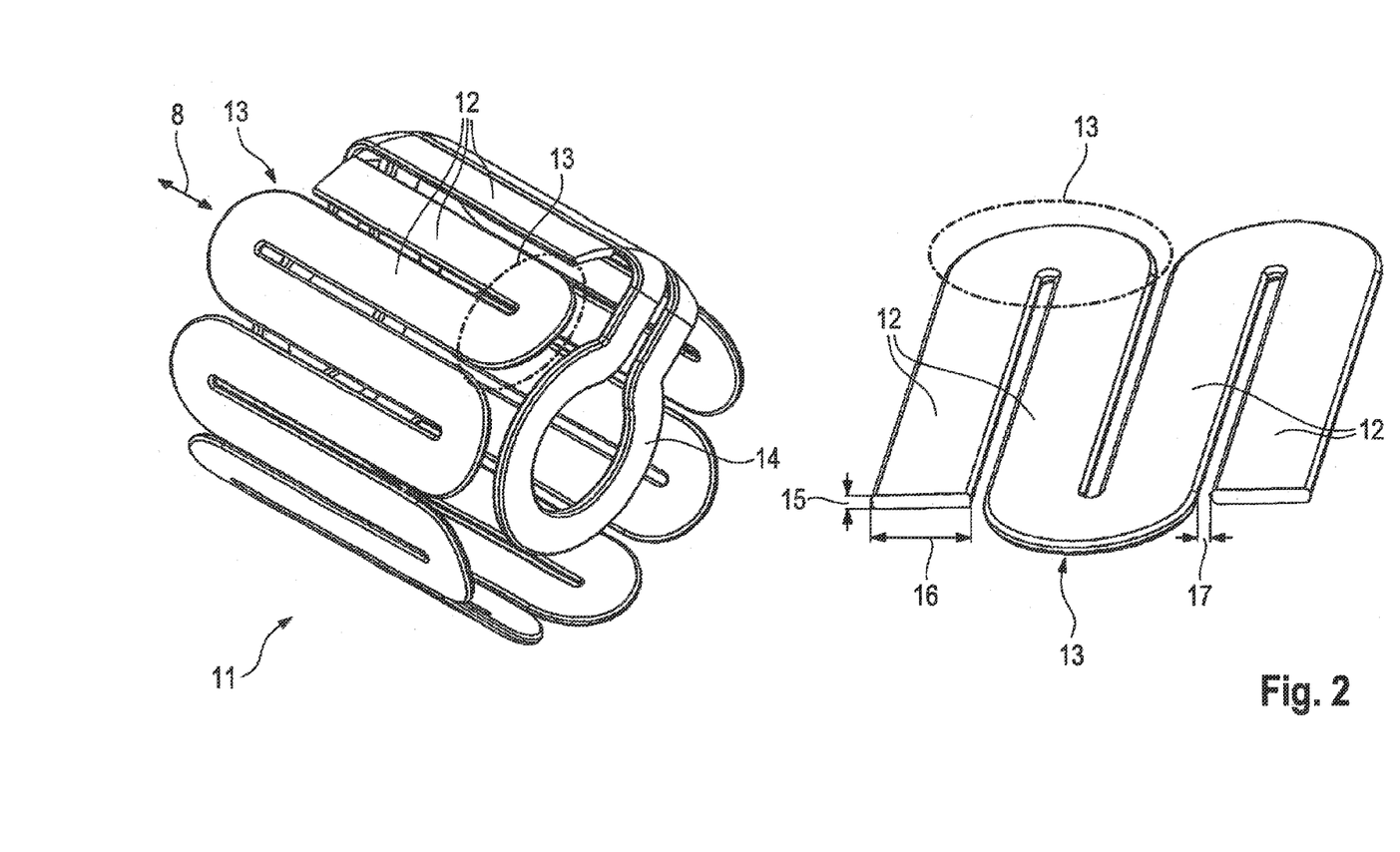
FIG. 2 shows a cooling channel geometry of the electrical machine according to the invention according to a first exemplary embodiment.

FIG. 2 shows the cooling duct 11 for a first exemplary embodiment of the electrical machine 1. The cooling duct 11 comprises channels 12 arranged in parallel. In this embodiment, the channels 12 extend in the axial direction 8 and are distributed along the circumferential direction 9 of the stator housing 2. In each case, two adjacent channels 12 are connected to one another by a deflector portion 13. This results in a meandering cooling duct 11 along the circumference. A section of the cooling duct 11 is shown in detail in the right-hand part of FIG. 2. Here, it can be seen that the channels 12 are rectangular in shape and have a channel height 15 and a channel width 16. The channel height 15 is less than the channel width 16. This results in flat, broad channels 12. A spacing 17 is indicated between two channels. Preferably, a ratio of the spacing 17 to the channel width 16 lies between 1/10 and 2.

FIG. 2 also shows the design of a bearing cooling loop 14. Two of the channels 12 are connected to one another by the bearing cooling loop 14 instead of by a deflector portion 17. This bearing cooling loop 14 passes around a bearing point of the rotor shaft 7 and therefore also simultaneously cools this bearing point.

A second and third exemplary embodiment of the machine are explained in detail with reference to FIGS. 3 to 6.

Figure 3:
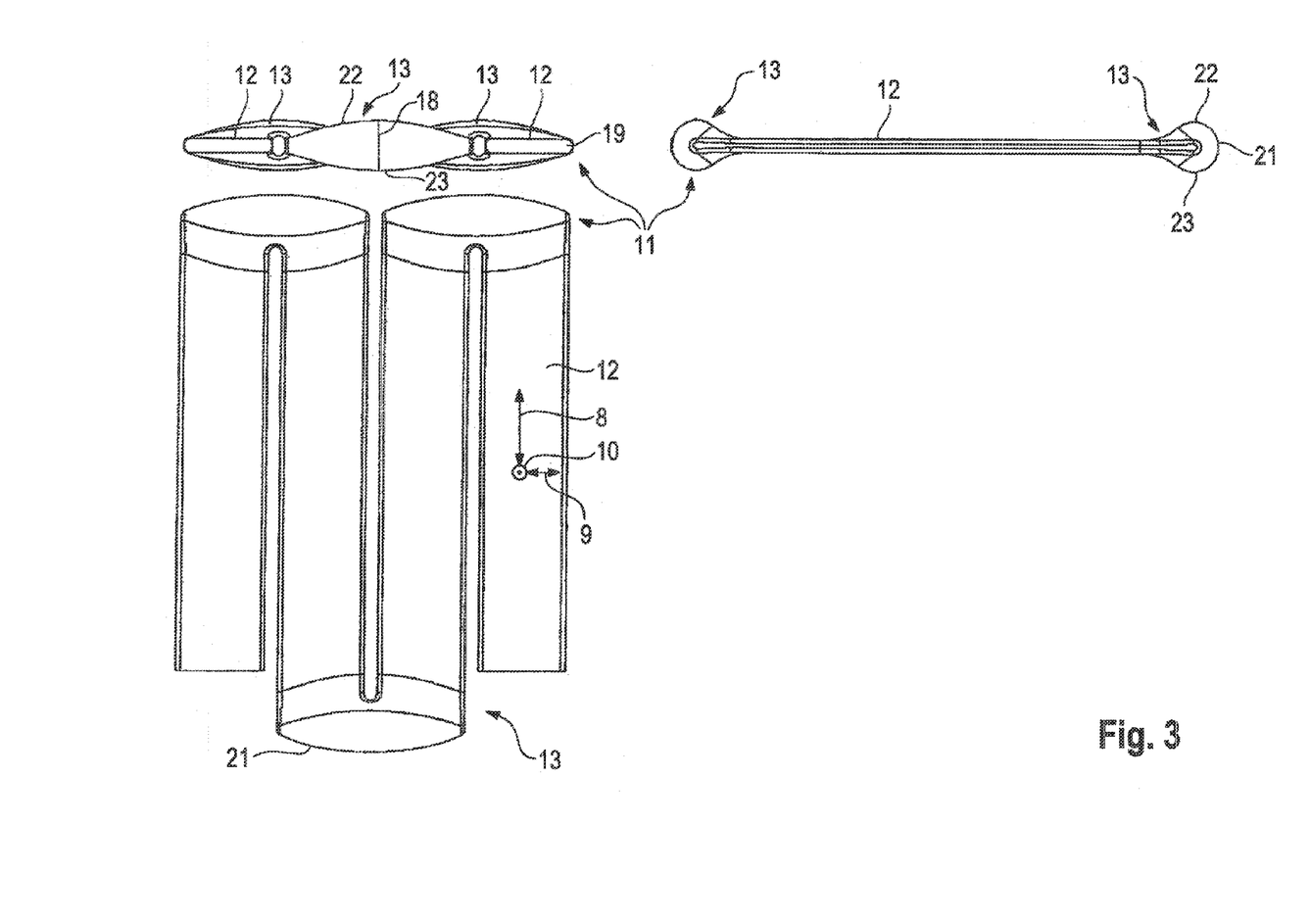
FIGS. 3 and 3a shows a section of the cooling channel of the electrical machine according to the invention according to a second exemplary embodiment.

FIG. 3 shop s a section of the cooling duct 11 in three different views. Here, the deflector portions 13 are banana-shaped. As can be seen, this banana shape has a first curvature 21, a second curvature 22 and a third curvature 23.

The second curvature 22 and the third curvature 23 in each case extend in the radial direction 10 and thins form two opposing convex edges of the banana shape. The first curvature 21, which presents a convexly curved edge of the banana shape in the axial direction 8, is provided for a further flow-enhancing design of the deflector portion 13.

Figure 3A:
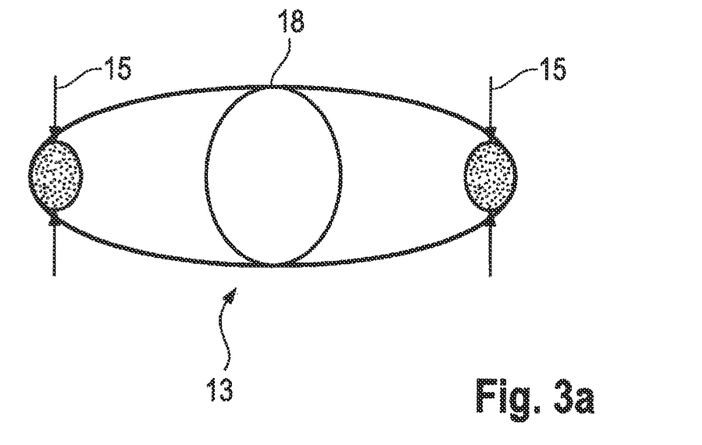

Furthermore, FIG. 3a shows a single banana-shaped deflector portion 13 by way of example. In the embodiment shown, it can be seen that, at its two ends, the deflector region tapers from its maximum cross-sectional area 18 to the channel height. The ratio of the maximum cross-sectional area 18 in the deflector portion 13 and the mean cross-sectional area 19 in the channel 12 should lie in the region between 0.5 and 4. Preferably, this ratio lies between 1 and 2.

Figure 4:
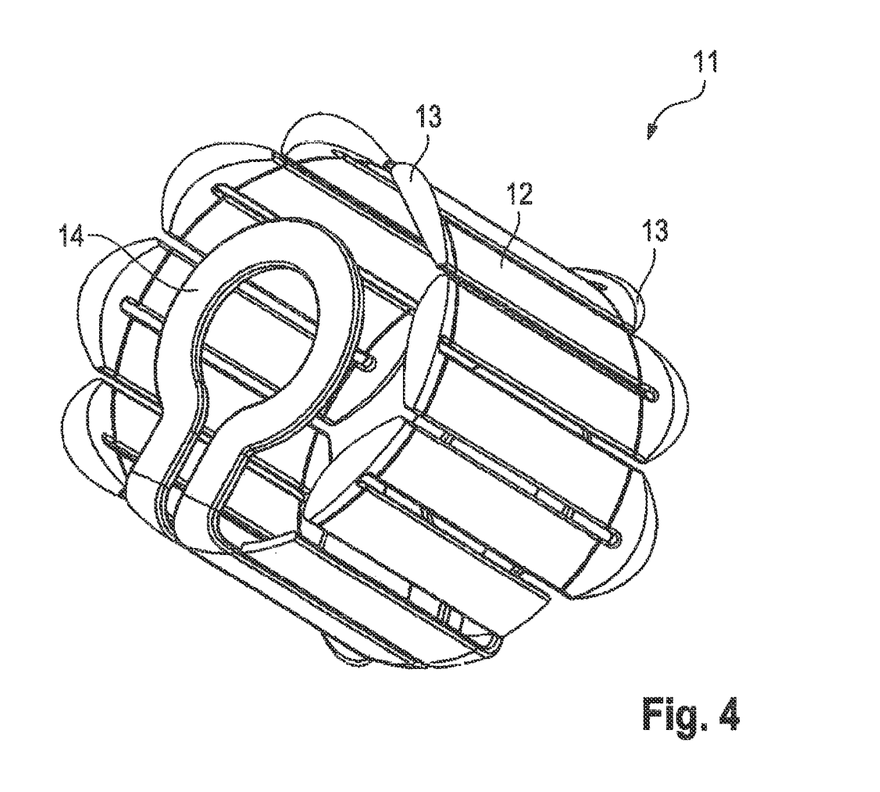
FIG. 4 shows a cooling channel geometry of the electrical machine according to the invention according to a third exemplary embodiment.

FIG. 4 shows a third exemplary embodiment of the electrical machine. Here, the deflector portions 13 are likewise banana-shaped. A bearing cooling loop 14, as has been shown in the first exemplary embodiment for example, can also be provided here.

Figure 5:
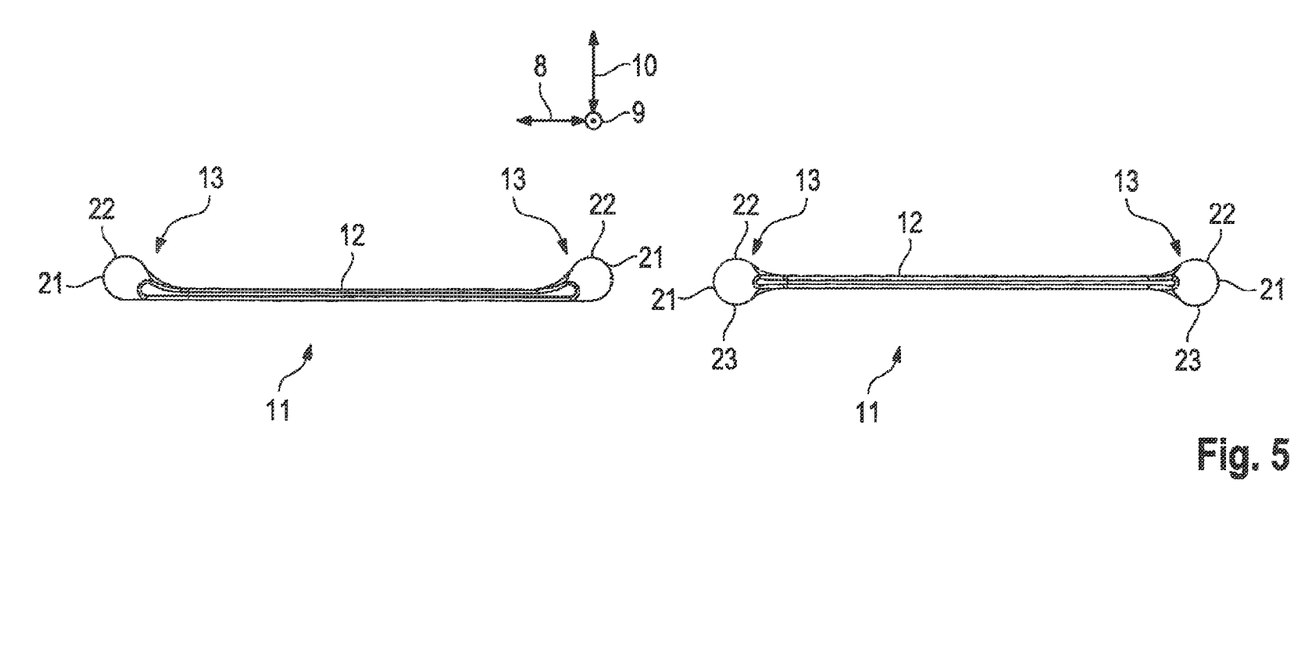
FIG. 5 shows a comparison of the cooling channels of the electrical machines according to the invention according to the second and third exemplary embodiment.

The essential difference between the second and third exemplary embodiment is that, in the third exemplary embodiment, the third curvature 23 is not provided on the banana shape. As a result, the radially inner boundary of the deflector portion 13 is the same height as a radially inner boundary of the channels 12. This difference between the second and third exemplary embodiment can be seen particularly in FIG. 5. On the left-hand side, FIG. 5 shows the design of the cooling duct 11 according to the third exemplary embodiment. The cooling duct 11 according to the second embodiment is provided on the right-hand side. As can be seen here, in the third exemplary embodiment, the radially inner side of the channels 12 lies flush with the radially inner side of the deflector portions 13.

Figure 6:
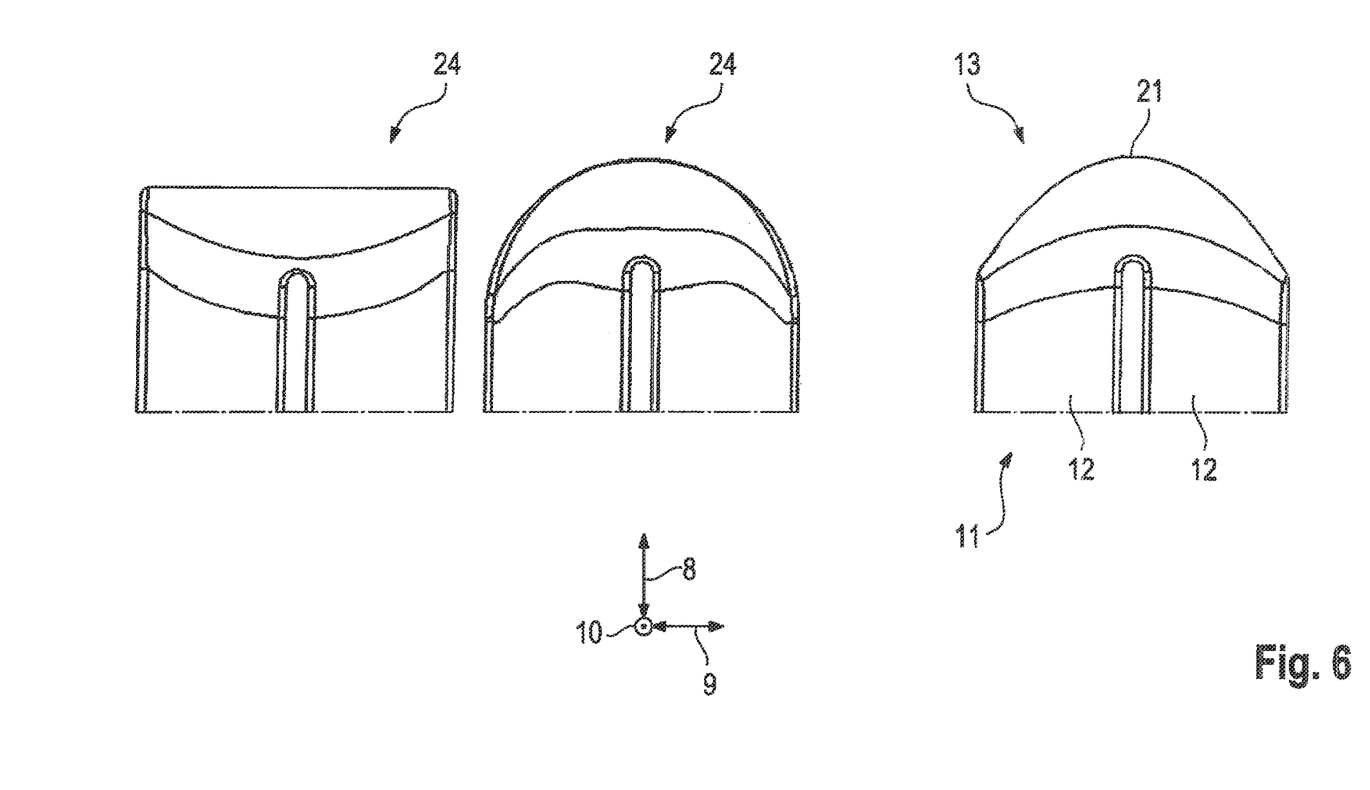
FIG. 6 shows the exact design of the deflector region of the cooling channel of the electrical machines according to the invention according to the second and third exemplary embodiment.

The banana-shaped design of the deflector portions 13 in the second and third exemplary embodiment is explained in more detail below. The two left-hand diagrams in FIG. 6 show two comparative examples 24. In the one comparative example 24, no curvature of any kind is provided. In the right-hand comparative example 24, a circular curvature is provided. Tests have shown that the flow can be optimally deflected when, in particular, the first curvature 21 lies between these two extreme comparative examples 24.

Figure 7:
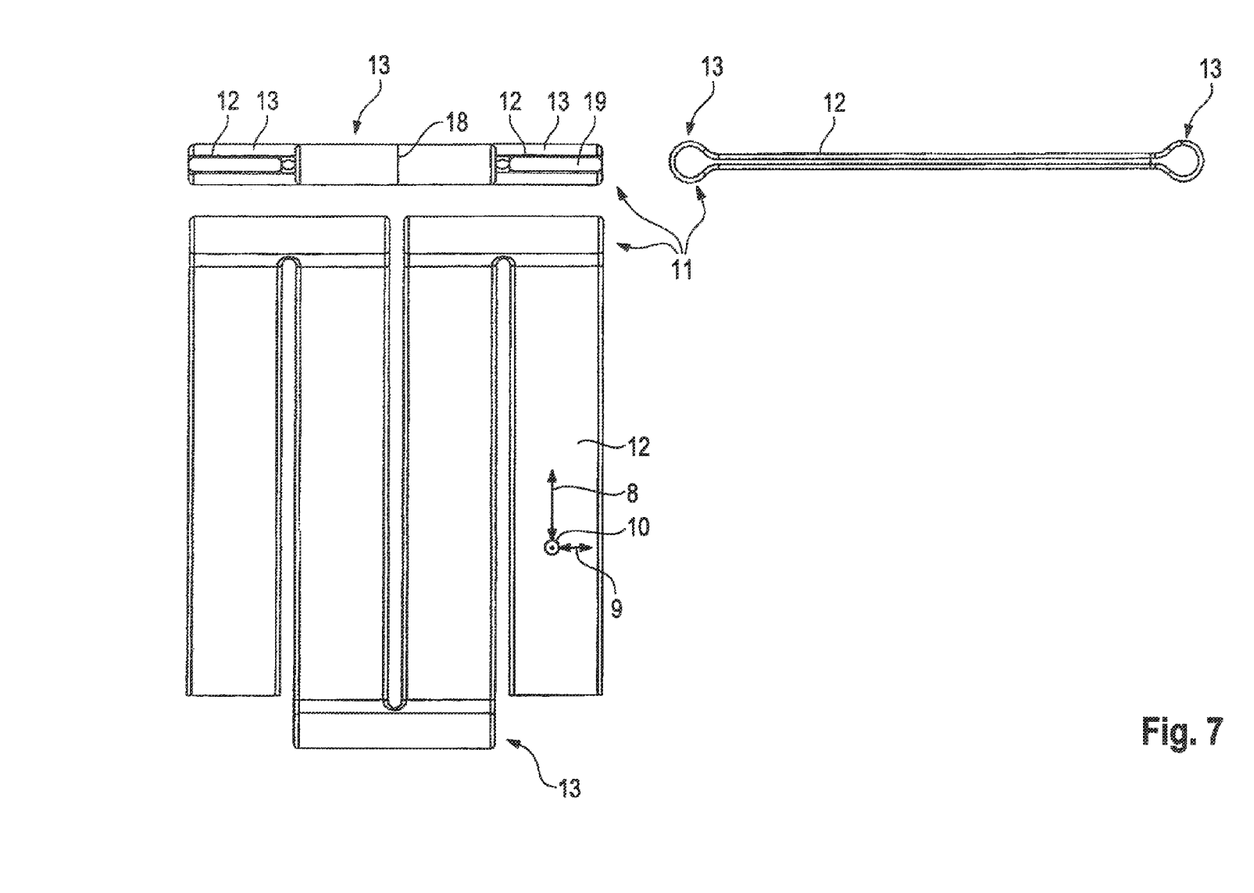
FIG. 7 shows a section of the cooling channel of the electrical machine according to the invention according to a fourth exemplary embodiment.

FIG. 7 shows a fourth exemplary embodiment of the electrical machine 1. Again, three views of the cooling duct 11 are shown here. The deflector portions 13 are formed here by straight, round tubes. These tubes extend in the circumferential direction 9. The channels 12 open out into the sleeve surfaces of the tubular deflector portions 13, wherein the contact point has been generously rounded.

Figure 8:
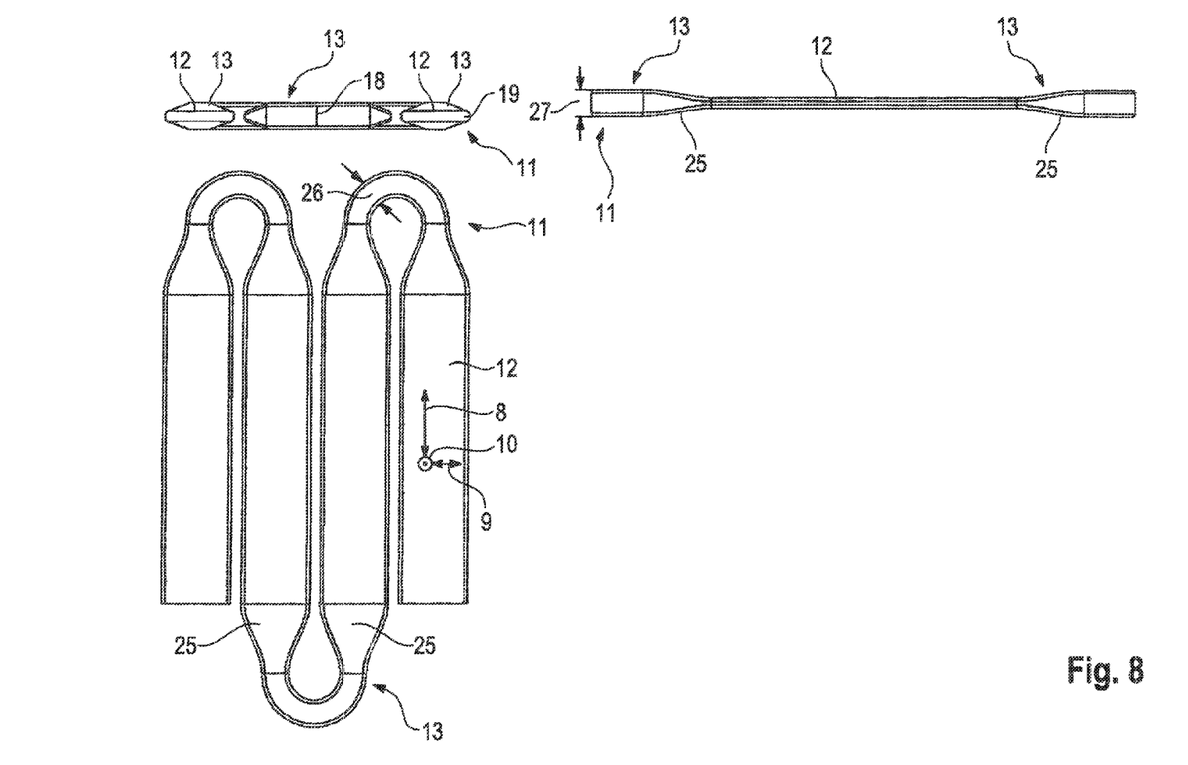
FIG. 8 shows a section of the cooling channel of the electrical machine according to the invention according to a fifth exemplary embodiment.

FIG. 8 shows the design of the cooling duct 11 in three different views of a fifth exemplary embodiment of the electrical machine 1. Here, the deflector portions are in the form of curved tubes. Here, these tubes are rectangular and curved through 180 degrees so that the channels 12 open out into the face sides of the curved deflector portions 13. It is particularly provided here that a ratio of the indicated deflection height 27 to the indicated deflection width 26 lies between 1/7 and 7.

Here, narrower sections 25 are preferably arranged between the deflector portions 13 and the channels 12.

Figure 9:
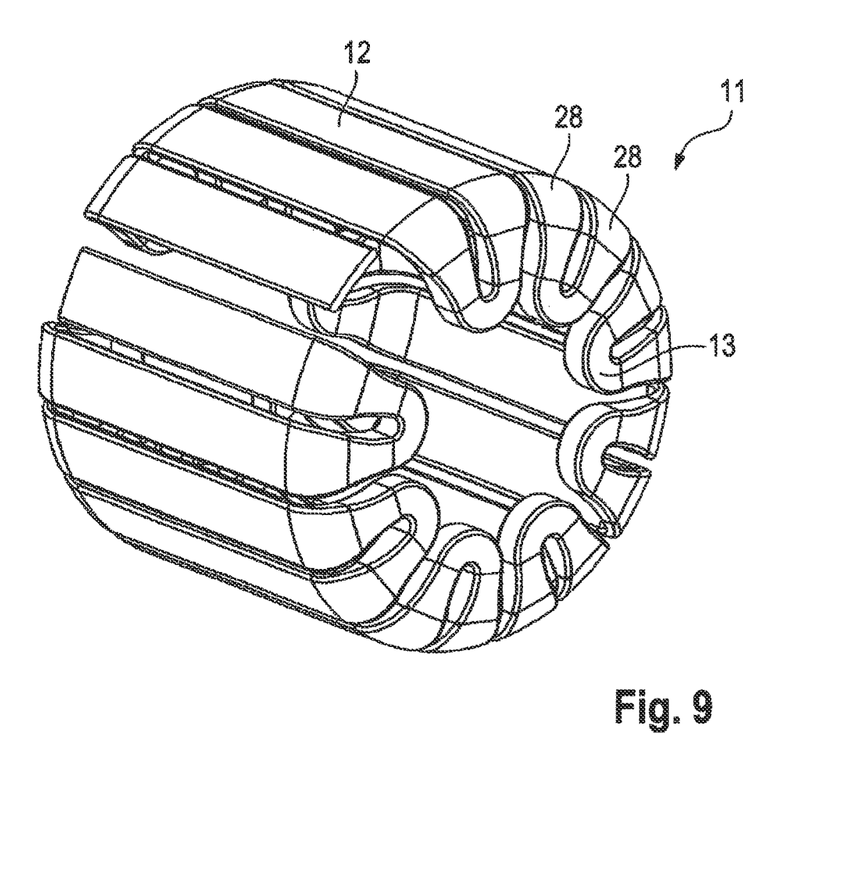
FIG. 9 shows a cooling channel geometry of the electrical machine according to the invention according to a sixth exemplary embodiment.

FIG. 9 shows the design of the cooling duct 11 in an electrical machine 1 according to a sixth exemplary embodiment. Here, it is shown how the deflector portions 13 can be relocated in the face surface of the stator housing 3. As a result, the deflector portions 13 are closer to the bearing point of the rotor shaft 7 and can also be used for cooling the bearing point. In particular, here, intermediate pieces 28 are provided between the channels 12 and deflector portions 13. In particular, these intermediate pieces 28 have a bend through approximately 90 degrees.

Different deflector portions 13 can also be used in all exemplary embodiments. Furthermore, different arrangements for cooling the bearing points of the rotor shaft 7 can be used in all exemplary embodiments. Examples of this design of the cooling system are the bearing cooling loop 16 or the relocation of the deflector portions 13 in the face side of the stator housing 2.

The cross sections of the channels 12 or deflector portions 13 can also be circular, elliptical or rectangular. Furthermore, the deflector portions 13 do not necessarily have to be symmetrical.

LIST OF REFERENCES

1 Electrical machine
2 Stator housing
3 Base body
4 Cover
5 Stator
6 Rotor
7 Rotor shaft
8 Axial direction
9 Circumferential direction
10 Radial direction
11 Cooling duct
12 Channels
13 Deflector portion
14 Bearing cooling loop
15 Channel height
16 Channel width
17 Spacing
18 Maximum cross-sectional area in the deflector portion
19 Cross-sectional area in the channel
21,22,23 Curvature or convex edges 24 Comparative examples
25 Narrower section
26 Deflection width
27 Deflection height
28 Intermediate pieces The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrical machine for driving a vehicle, comprising:
    a rotor having a rotor shaft extending in the axial direction;
    a stator encompassing the rotor; and
    a stator housing which accommodates the stator and has an integral cooling duct,
    wherein the cooling duct is formed by an alternating sequence of channels extending in the axial direction and a plurality of deflector portions, each of which connects adjacent ones of said channels in a meandering fashion,
    wherein the cooling duct comprises a bearing cooling loop for cooling a bearing of the rotor shaft is formed in the cooling duct, the bearing cooling loop extending around the rotor shaft and connecting adjacent channels in place of one of the plurality of deflector portions, and
    wherein the channels, deflector portions and the bearing cooling loop merge impermeably into one another to form a closed cooling duct in which a coolant is confined and fluidic contact by the coolant with the rotor shaft is prevented.

2. The electrical machine as claimed in claim 1, wherein, in each case, a deflector portion connects only two channels to one another.

3. The electrical machine as claimed in claim 1, wherein each of the deflector portions combine the coolant flow from two or more channels and/or distributes it between two or more channels.

4. The electrical machine as claimed in claim 1, wherein the channels are rectangular, and wherein a ratio of channel height to channel width lies between $1/10$ and $1/2$.

5. The electrical machine as claimed in claim 1, wherein the channels extend in a sleeve surface of the stator housing parallel to the axial direction or are inclined at a maximum angle of 30° with respect to the axial direction.

6. The electrical machine as claimed in claim 1, wherein the channels extend in a sleeve surface of the stator housing tangentially around the motor axis.

7. The electrical machine as claimed in claim 1, wherein the ratio between the spacing and the width of the channels in a sleeve surface of the stator housing lies between $1/10$ and 2.

8. The electrical machine as claimed in claim 1, wherein a ratio of the maximum cross-sectional area of the deflector portions to the mean cross-sectional area of the channels lies between 0.5 and 4.

9. The electrical machine as claimed in claim 8, wherein a ratio of the maximum cross-sectional area of the deflector portions to the mean cross-sectional area of the channels lies between 1 and 2.

10. The electrical machine as claimed in claim 1, wherein the deflector portions extend in the circumferential direction, and the channels open out laterally into the deflector portions.

11. The electrical machine as claimed in claim 1, wherein at least one deflector portion is designed as a straight tube, and wherein the channels open out into a sleeve surface of the tube.

12. The electrical machine as claimed in claim 1, wherein at least one deflector portion is banana-shaped so that the cross-sectional area in the at least one deflector portion increases to a maximum along the circumferential direction and, after the maximum, decreases once more, wherein the channels open out into a sleeve surface of the banana shape.

13. The electrical machine as claimed in claim 12, wherein the banana-shaped deflector portion has a convex curvature in the axial direction and/or in the radial direction.

14. The electrical machine as claimed in claim 1, wherein a radially innermost boundary of the channels is at the same distance from the rotor shaft as a radially innermost boundary of the deflector portions.

15. The electrical machine as claimed in claim 1, wherein at least one deflector portion is in the form of a curved tube, wherein the tube is curved such that the channels open out into the tube on a face side.

16. The electrical machine as claimed in claim 1, wherein the channels have an intermediate piece that is curved through approximately 90°, wherein the intermediate piece is configured to connect to the deflector portions so that at least one deflector portion is arranged in a face side of the stator housing.

17. The electrical machine as claimed in claim 1, wherein the stator housing comprises a base body and a cover, wherein the deflector portions of one side and the channels are formed integrally in the base body, and wherein the deflector portions of the other side are formed in the cover.

18. The electrical machine as claimed in claim 1, wherein the stator housing comprises a base body and two covers, wherein the channels are formed integrally in the base body, and wherein the deflector portions are formed in the two covers.

* * * * *